April 22, 1969 C. F. DRAKE ET AL 3,440,588
GLASSY BISTABLE ELECTRICAL SWITCHING AND MEMORY DEVICE
Filed Sept. 26, 1966

Inventors
CYRIL F. DRAKE
IAN F. SCANLAN
JOHN H. ALEXANDER
By Philip M. Bolton
Attorney Inventors
CYRIL F. DRAKE
IAN F. SCANLAN
JOHN H. ALEXANDER
By Philip M. Bolton
Attorney

United States Patent Office 3,440,588

Patented Apr. 22, 1969

3,440,588

GLASSY BISTABLE ELECTRICAL SWITCHING AND MEMORY DEVICE

Cyril Francis Drake, Ian Francis Scanlan, and John Henry Alexander, Harlow, England, assignors to International Standard Electric Corporation, New York, N.Y., a corporation of Delaware Filed Sept. 26, 1966, Ser. No. 582,124
Claims priority, application Great Britain, Nov. 10, 1965, 47,656/65
Int. Cl. H01c 7/10
U.S. Cl. 338—20 4 Claims

ABSTRACT OF THE DISCLOSURE

This is a glassy bistable switching device which can be switched from a state of high impedance to a state of low impedance and vice versa. The device comprises a thin layer of glassy material formed between two electrodes. The composition of the glassy material is about 46% boric oxide, about 15% calcium oxide and about 39% copper oxide.

This invention relates to electrical switching and memory devices and in particular to the class of bistable devices in which either a high or low impedance condition or one of a number of intermediate states is maintained in the absence of any bias current after the switching current has been removed.

According to the invention there is provided an electrical switching and memory device including a mass of glassy material with two spaced electrodes making intimate contact with the material, the glassy material including one of the class of oxides technically known as glass-forming oxides and an oxide of a metal of variable valency.

It has been discovered that if two electrodes are spaced by a thin region of glassy material with which they are in intimate contact, then the conductivity of at least a part of the glassy material can be altered by the application of a suitable electrical signal to the electrodes. The glassy material would normally be considered to be an insulator, and the specific resistivity of the material is typically of the order of $10^{10}$ ohm cm. at room temperature in one of its bistable "states." By glassy material we mean material that would normally be described as glass, glass-like, vitreous, or amorphous. An alternative way of describing these materials is to say that order, or a regular repetition of atomic arrangement and spacing, continues at the most for a few atomic spacings. The glasses that we chose to use normally are those based on oxides of suitable elements, and in particular those containing $SiO_2$ or $B_2O_3$ or $P_2O_5$ as the "glass-forming" oxide together with one or more metal oxides.

In a preferred embodiment the glassy material is composed of at least one glass-forming oxide, at least one oxide of a metal of Group II of the Periodic Table and at least one oxide of a metal of variable valency. An example of such a material is one composed of 1.2 gms. of boric oxide, 0.4 gm. of calcium oxide and 1.0 gm. of copper oxide (CuO).

Figure 1:
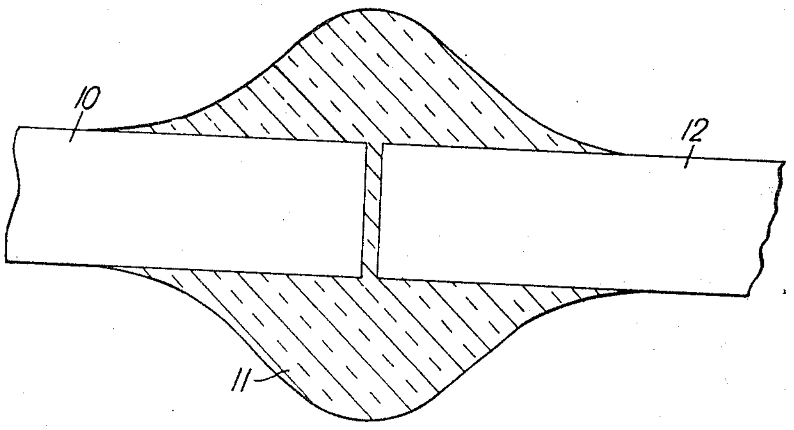
Figure 2:
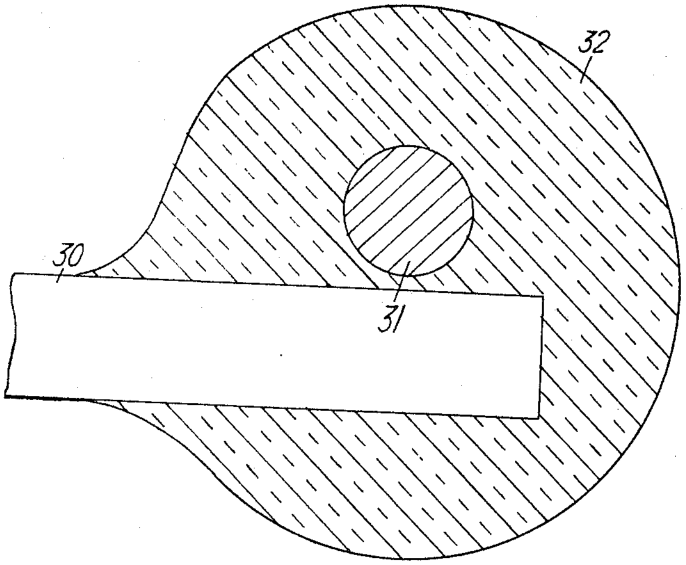
Figure 3:
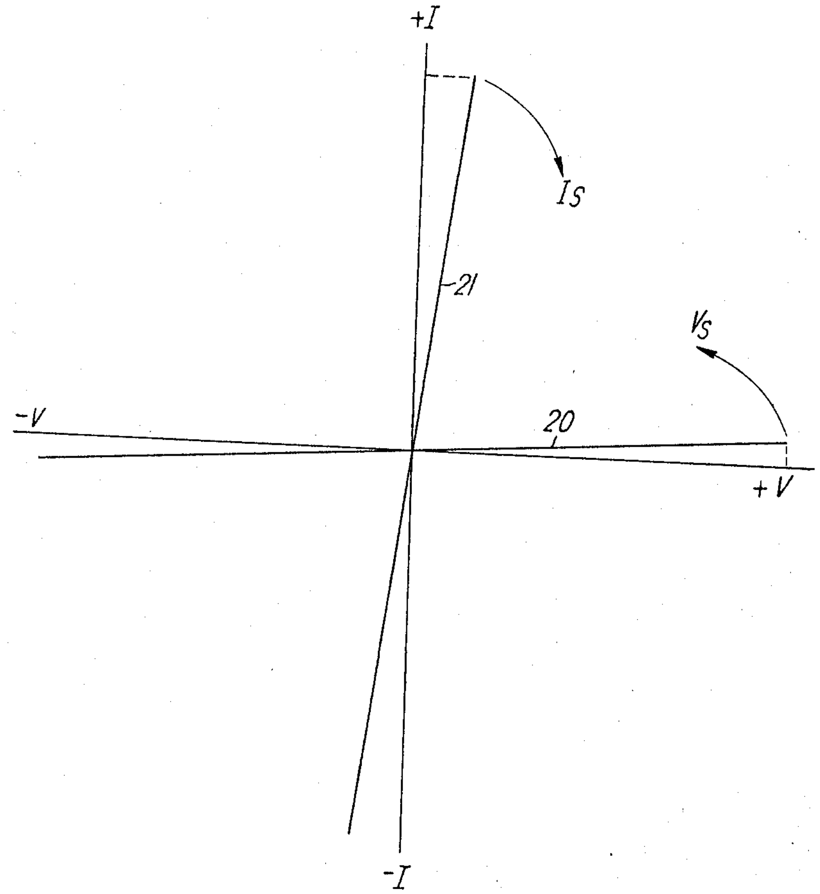

The above and other features of the invention will become more apparent and be better understood from the following description of embodiments of the invention, taken in conjunction with the accompanying drawings in which FIG. 1 is a sectional elevation through one form of switching device, FIG. 2 is a sectional elevation through an alternative form of device to that shown in FIG. 1, and FIG. 3 illustrates graphically a typical voltage/current characteristic of a device as shown in FIG. 1.

The device illustrated in FIG. 1 is made by melting a mixture of 1.2 gms. of boric oxide, 0.4 gm. of calcium oxide and 1.0 gm. of copper oxide (CuO) in a porcelain crucible in air at a temperature of 1150° C. This mixture thus forms a glassy material having a composition of about 46% boric oxide, about 15% calcium oxide and about 39% copper oxide.

A platinum wire 10, approximately 0.5 mm. thick, is dipped into the molten glassy material and removing a bead of glass 11 from the melt. The bead 11 is subsequently reheated until it is molten and a second platinum wire 12 is inserted into the molten bead in such a way that the ends of the two wires are separated by a film of glass about 50 microns thick.

Such a device when measured at low voltages exhibits the high impedance characteristic 20 normally associated with glassy materials. It behaves like an ohmic resistor with a symmetrical voltage/current characteristic and a resistance of between $10^6$ and $10^{12}$ ohms.

In certain cases it may be necessary to apply an initial "forming" voltage before the device will exhibit its desired low impedance characteristic. Such a forming voltage is normally greatly in excess of any subsequent switching voltage, i.e. several hundred volts, in either direction. It is of great importance that the device be formed in a circuit in which the peak current after the initial breakdown is limited by the circuit to a few milliamps. A convenient method of doing this is to use a $10^5$ ohm cm. resistor in series with the device during forming.

The formed device now exhibits a low impedance, typically 10 ohms, and is henceforth described as being "on" when in this condition. It will now remain on indefinitely, on open-circuit, short-circuit or when a small A.C. or D.C. voltage is applied to the terminals. The characteristic 21 when in the low impedance condition is also symmetrical.

To switch the device from the low impedance "on" state to the high impedance "off" state it is necessary to apply a current pulse $I_s$. The current pulse $I_s$ must have a rapid change of current with time and is conveniently steep edged or square pulse of duration not exceeding 1$\mu$ sec.

The device will remain indefinitely in the "off" state in the open-circuit or short-circuit condition or when a voltage less than the switching voltage $V_s$ is applied to it. When the applied voltage reaches or exceeds $V_s$ the device is turned on once more.

An alternative construction to that of FIG. 1 is shown in FIG. 2. In this case the wire electrodes 30, 31 are arranged at right angles to one another in the glass bead 32 and are offset so that electrode 30 passes over electrode 31 at a distance of about 50 microns. The advantage of this construction is that the current path is restricted to a particular portion of the material, i.e. the shortest path between the two electrodes is easily defined. This is in contrast to the construction of FIG. 1 where the current path between the two flat parallel surfaces can not be easily defined unless the two surfaces are considerably reduced in area. The characteristics of the device shown in FIG. 3 are similar to those illustrated in FIG. 2.

One method of making a switching device has been described above. An alternative method is to prepare a thin film of the glass-forming oxide on a suitable substrate and subsequently to deposit a film of the metal or metals which are to provide the metal oxide constituents of the glass on the said glass-forming oxide surface. The composite structure is then heated in an oxygen containing atmosphere, producing a thin film of the glass on a metal substrate. The second electrode is applied by evaporating a discrete metal area on the upper surface of the glass and making a pressure or solder contact to this area.

Yet another method of making a device is to pass a glow discharge through a low pressure mixture of oxygen and volatile compounds of the elements from which the glass is made, with a heated metal substrate suitably placed to receive a deposit of the glass. The latter process can be conducted according to the teaching of U.S. patent application No. 452,487 (H. F. Sterling-R. C. G. Swann). The glass may also be deposited on a metal or other conducting substrate by vacuum evaporation or sputtering of a suitable source material.

An alternative composition of a glassy material suitable for a switching device is one based on phosphorous pentoxide as the glass forming oxide and containing an oxide of tungsten, which is a metal of variable valency.

Another alternative composition which has been found to be suitable consists of a glass in which phosphorous pentoxide is the glass forming oxide, cadmium oxide is the oxide of the Group II metal and the amount of variable valence metal oxide is the maximum that can be added without de-vitrification of the glass.

In an alternative construction the glassy material takes the form of a layer deposited on a substrate electrode with one or more separate electrodes formed on top of the glass layer.

What we claim is:

1. An electrical switching and memory device including:

a thin film glassy material, said thin film having a composition of about 46% boric oxide, about 15% calcium oxide and about 39% copper oxide; and at least two spaced electrodes attached to and separated by said thin film.

2. A device according to claim 1 wherein said electrodes are coaxially positioned in relation to one another.

3. A device according to claim 1 wherein said electrodes are placed at right angles to one another.

4. A device according to claim 1 in which said electrodes are of platinum.

References Cited

UNITED STATES PATENTS

| | | | |
|---|---|---|---|
| 1,526,139 | 2/1925 | Grondahl | 338—20 |
| 2,332,596 | 10/1943 | Pearson | 338—23 |
| 3,024,435 | 3/1962 | Rollins et al. | 338—20 |
| 3,312,923 | 4/1967 | Eubank | 338—20 |

FOREIGN PATENTS 790,363 2/1958 Great Britain.

OTHER REFERENCES

George S. Brady: Materials Handbook, McGraw-Hill Book Co., N.Y. 9th ed., 1963. pp. 343–347.

REUBEN EPSTEIN, *Primary Examiner.*

U.S. Cl. X.R.

252—518, 521; 307—324; 317—238